United States Patent
Chen et al.

(10) Patent No.: US 9,454,618 B1
(45) Date of Patent: Sep. 27, 2016

(54) INTELLIGENT RENDERING OF WEBPAGES

(71) Applicant: International Business Machines Corporation, Armonk, NY (US)

(72) Inventors: Xiang Chen, Beijing (CN); Bin Gu, Beijing (CN); Cheng Fang Wang, Beijing (CN); WuMi Zhong, Beijing (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/040,098

(22) Filed: Feb. 10, 2016

Related U.S. Application Data

(63) Continuation of application No. 14/851,066, filed on Sep. 11, 2015.

(51) Int. Cl.
*G06F 15/16* (2006.01)
*G06F 17/30* (2006.01)
*H04L 29/08* (2006.01)

(52) U.S. Cl.
CPC ......... *G06F 17/30899* (2013.01); *H04L 67/02* (2013.01)

(58) Field of Classification Search
CPC ................ G06F 17/30899; G06F 17/30864; G06F 17/30902; H04L 67/02
USPC ................. 715/234; 709/203, 219
See application file for complete search history.

(56) References Cited

U.S. PATENT DOCUMENTS

| | | | |
|---|---|---|---|
| 6,657,647 B1 | 12/2003 | Bright | |
| 7,725,574 B2 | 5/2010 | O'Connell et al. | |
| 8,255,793 B2 | 8/2012 | Chakrabarti et al. | |
| 8,413,044 B2 | 4/2013 | Mao | |
| 8,438,471 B2 | 5/2013 | Thorpe et al. | |
| 8,850,307 B2 | 9/2014 | Hanssen et al. | |
| 8,874,542 B2 | 10/2014 | Kritt et al. | |
| 8,893,014 B1 | 11/2014 | Au et al. | |
| 2006/0259585 A1* | 11/2006 | Keohane | G06F 17/30899 709/219 |
| 2009/0210781 A1 | 8/2009 | Hagerott et al. | |
| 2011/0289393 A1 | 11/2011 | Choi | |
| 2014/0067910 A1 | 3/2014 | Zhong et al. | |
| 2014/0250367 A1* | 9/2014 | Ivory | G06F 17/2247 715/234 |
| 2015/0088969 A1 | 3/2015 | Wei et al. | |

FOREIGN PATENT DOCUMENTS

CN 1841369 A 10/2006

OTHER PUBLICATIONS

Gupta, et al., "DOM-based Content Extraction of HTML Documents", ACM, Copyright is held by Suhit Gupta, Gail Kaiser, David Neistadt, P. Grimm, WWW2003, May 20-24, 2003, Budapest, Hungary, ACM, pp. 207-214.

(Continued)

*Primary Examiner* — John Macilwinen
(74) *Attorney, Agent, or Firm* — Alexander Jochym

(57) ABSTRACT

An indication to render a webpage is received. The webpage includes two or more frames and the two or more frames are rendered in a first order. A second order from a user is received. The webpage is rendered. The two or more frames of the webpage are rendered in the second order.

1 Claim, 3 Drawing Sheets

(56) References Cited

OTHER PUBLICATIONS

Krupp, Brian M., Exploration of Dynamic Web Page Partitioning for Increased Web Page Delivery Performance, ETD, Ohio Links, submitted in partial fulfillment of requirement for the degree Masters of Computer and Information Science, Cleveland State University, Dec. 2010, pp. 1-67.

"Using the F12 developer tools (Windows)", Microsoft, Printed on May 7, 2015, Copyright 2015, Microsoft, pp. 1-7, <https://msdn.microsoft.com/library/bg182326(v=vs.85).aspx>.

"XMLHttpRequest", Wikipedia, Last Modified, Apr. 10, 2015, Printed on May 7, 2015, pp. 1-8, <http://en.wikipedia.org/wiki/XMLHttpRequest>.

List of IBM Patents or Patent Applications Treated as Related, Appendix P, Filed Herewith.

Chen, et al., "Intelligent Rendering of Webpages", U.S. Appl. No. 14/851,066, filed Sep. 11, 2015.

* cited by examiner

INTELLIGENT RENDERING OF WEBPAGES

BACKGROUND OF THE INVENTION

The present invention relates generally to the field of internet browsing, and more particularly to intelligent rendering of webpages via user input.

The World Wide Web (www or W3) is an information system of interlinked hypertext documents and other digital resources that may be accessed via the Internet. It has become known simply as "the Web".

The hypertext documents found on the W3 are commonly called webpages, which are primarily text documents formatted and annotated with the Hypertext Markup Language (HTML). Webpages may contain links to images, video, and software components that are rendered to users of a web browser application, running on the user's computer, as coherent pages of multimedia content. In the context of a web browser, a frame is a part of a webpage or browser window which displays content independent of its container, with the ability to load content independently. The HTML or media elements that go in a frame may or may not come from the same website as the other elements of content on display. Embedded hyperlinks on a webpage permit users to navigate between webpages. When multiple webpages are published with a common theme or within a common domain name, the collection is usually called a website.

SUMMARY

Embodiments of the present invention include a method, computer program product, and system for intelligently rendering a webpage based on user input. In one embodiment, an indication to render a webpage is received. The webpage includes two or more frames and the two or more frames are rendered in a first order. A second order from a user is received. The webpage is rendered. The two or more frames of the webpage are rendered in the second order.

DETAILED DESCRIPTION

Some embodiments of the present invention recognize that a lot of time is spent using the internet to access non-relevant information. Complex webpages take too long to load, especially when a user has a slow connection to the network. And it may be frustrating for the user who is looking for a specific item if that item happens to be the last one to load on a webpage during the page rendering. Searching for specific content yields page after page of search results. Determining the best webpage is time consuming. And webpage owners can pay to keep their webpage on top so the first webpage to load may not include the best content. The only way to find out is to look at the webpage. And now we are back to the amount of time it takes to load that complex webpage. More wasted time.

Embodiments of the present invention recognize that there may be a better way to navigate the vast amount of data and information available on the W3 (World Wide Web). Providing control to a user to determine what content loads first on a webpage would save the user time. A webpage, selected from a list of webpages after an internet search, could load the content containing the search term(s) first so that the user could determine if that particular webpage contained the desired information. Both of these improvements may be achieved with a simple web browser program.

Figure 1:
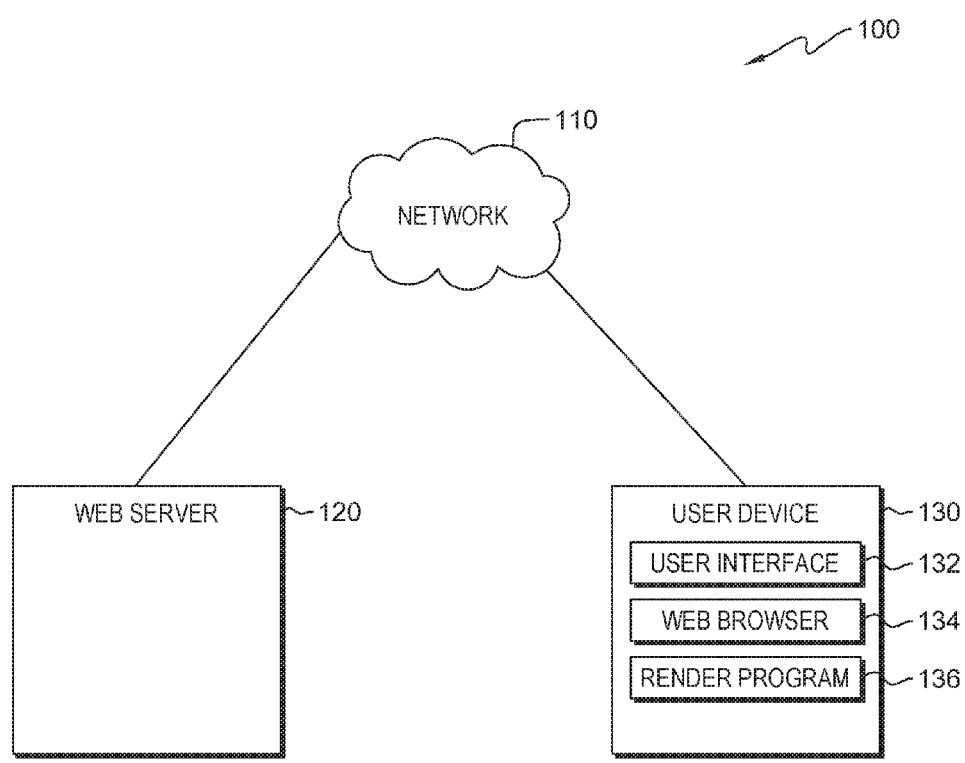
FIG. 1 is a functional block diagram of a computing environment, in accordance with an embodiment of the present invention.

The present invention will now be described in detail with references to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes web server 120 and user device 130, interconnected over network 110. In an example embodiment, utilizing network 110, web server 120 may communicate with user device 130. In example embodiments, computing environment 100 can include other computing devices not shown such as smartwatches, cell phones, smartphones, phablets, tablet computers, laptop computers, desktop computers, computer servers or any other computer system known in the art.

In example embodiments, web server 120 and user device 130 may connect to network 110 which enables web server 120 and user device 130 to access other computing devices and/or data not directly stored to web server 120 and user device 130. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between web server 120, user device 130, and other computing devices (not shown) within computing environment 100, in accordance with embodiments of the present invention.

In various embodiments of the present invention, web server 120 may be a laptop, tablet or netbook personal computer (PC), a desktop computer, a personal digital assistant (PDA), a smartphone, or any programmable electronic device capable of communicating with any computing device within computing environment 100. Web servers are computers that deliver webpages. Every web server has an IP (Internet Protocol) address and possibly a domain name. For example, if you enter the URL http://www.webopedia.com/index.html in your browser, a request is sent to the Web server whose domain name is webopedia.com. The web server then fetches the page named index.html and sends it to your browser. Any computer can be turned into a Web server by installing server software and connecting the machine to the Internet. There are many Web server software applications, including public domain software and commercial packages. In certain embodiments, web server 120 represents a computer system utilizing clustered computers and components (e.g., database server computers, application server computers, etc.) that act as a single pool of seamless resources when accessed by elements of computing environment 100 (e.g., user device 130). In general, web server 120 is representative of any electronic device or combination of electronic devices capable of executing computer readable program instructions. User device 130 is substantially similar to web server 120 and has substantially similar components. Web server 120 may include components as depicted and described in further detail with respect to FIG. 3, in accordance with embodiments of the present invention.

According to embodiments of the present invention, user device 130 includes user interface 132, web browser 134, and render program 136.

In example embodiments, user interface 132 provides an interface between a user of user device 130, network 110 and any other devices connected to network 110. User interface 132 allows a user of user device 130 to interact with web browser 134 and also enables the user to receive an indicator of one or more previous viewing locations and a summary of viewing history. In general, a user interface is the space where interactions between humans and machines occur. User interface 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 132 may also be mobile application software that provides an interface between a user of user device 130 and network 110. Mobile application software, or an "app," is a computer program designed to run on smartphones, phablets, tablet computers and other mobile devices.

In an embodiment of the present invention, web browser 134 (commonly referred to as a browser) is a software application whose primary purpose is to bring information resources to the user ("retrieval" or "fetching"), allowing them to view the information ("display", "rendering"), and then access other information ("navigation", "following links") on the W3. An information resource may be identified by a Uniform Resource Identifier (URI) and may be a webpage, image, video or other piece of content. The most common form of URI is the uniform resource locator (URL), frequently referred to informally as a web address. URLs occur most commonly to reference webpages (http), but may also be used for file transfer (ftp), email (mailto), database access (JDBC or Java Database Connectivity), and many other applications. Hyperlinks present in resources enable users to easily navigate their browsers to related resources. Although browsers are primarily intended to use the W3, they can also be used to access information provided by web servers in private networks or files in file systems. Common features found in browsers include: forward and back buttons, a refresh button, a stop button, a home button, an address bar, a search bar, and a status bar.

According to embodiments of the present invention, render program 136 is a web browser plug-in which enables a user to intelligently determine how the user would like a frame based webpage to render (i.e., display). In an embodiment of the present invention, render program 136 may be a plug-in. A plug-in is a software component that adds a specific feature to an existing software application. When an application supports plug-ins, it enables customization. Common examples of plug-ins are those used in web browsers to add new features such as search-engines, virus scanners, or the ability to utilize a new file type such as a new video format. Render program 136 allows a user to customize the render sequence of the various frames in a webpage. In the context of a web browser, a frame is a part of a webpage or browser window which displays content independent of its container, with the ability to load content independently. The hypertext markup language (HTML) or media elements that go in a frame may or may not come from the same website as the other elements of content on display.

Figure 2:
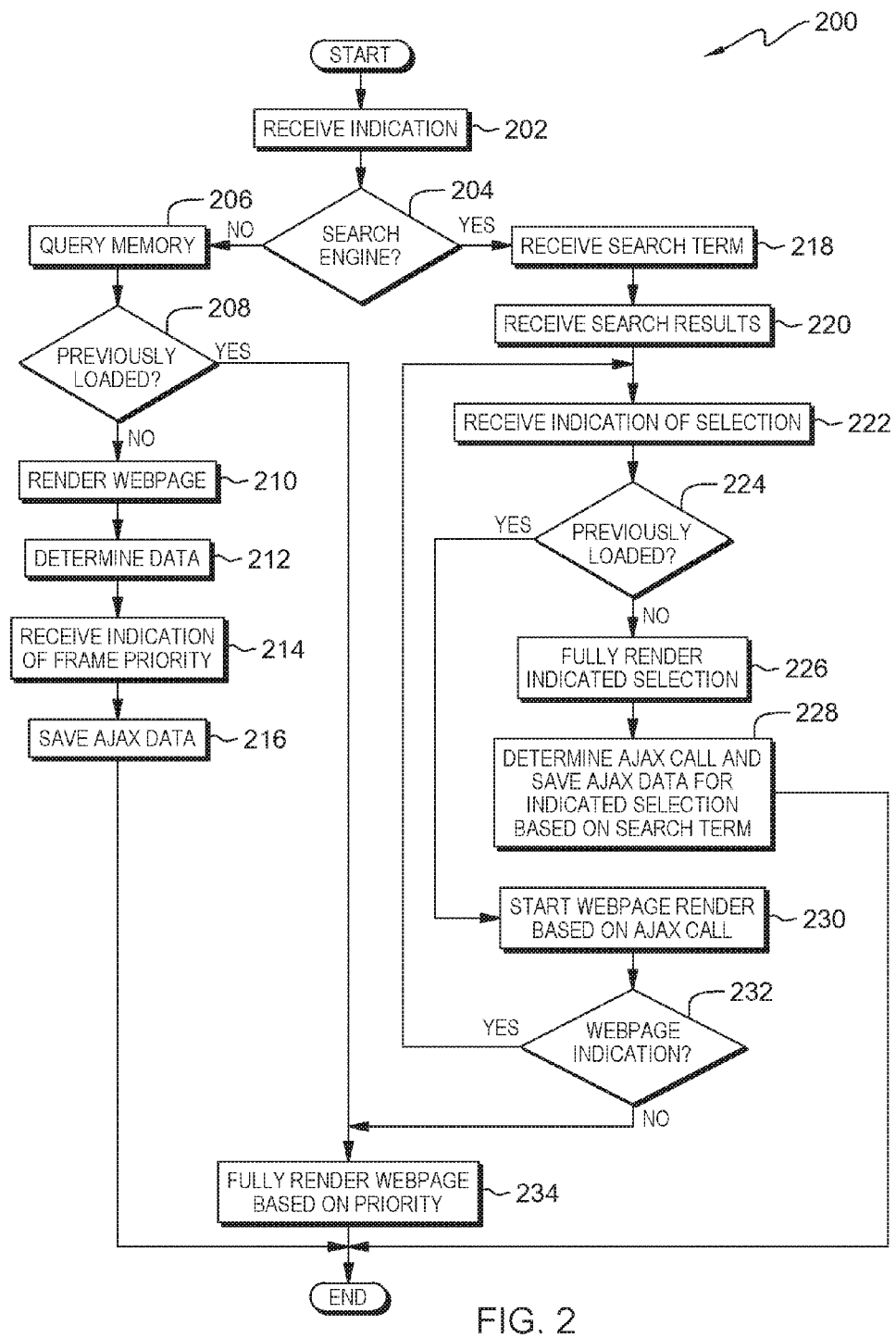
FIG. 2 is a flowchart depicting operational steps of a program that functions to intelligently render frame based webpages, in accordance with an embodiment of the present invention.

FIG. 2 is a flowchart depicting operational steps 200 of render program 136, on user device 130 within computing environment 100 of FIG. 1, a program for intelligently rendering frame based webpages, in accordance with an embodiment of the present invention.

Render program 136 receives an indication (step 202). In other words, render program 136 receives an indication that a user has requested a webpage, via user interface 132, to display via web browser 134 on user device 130. In one embodiment, the user requests the home page of a favorite news webpage of the user to load. For example, the user requests the home page of a local news channel. In another embodiment, the user requests a search engine to load. For example, the user enters SearchForinfo.com (note that this is a fictitious name used only for purposes of this example) in the URL field of the browser.

Render program 136 makes a determination (decision step 204). In other words, render program 136 determines whether the indicated webpage is a search engine. In an embodiment of the present invention, this determination may be achieved by render program 136 comparing the indicated webpage to a default list of available search engines created by render program 136. In another embodiment, the list of search engines may be created and/or modified by a user. In one embodiment (decision step 204, NO branch), render program 136 determines that the indicated webpage is not a search engine; therefore render program 136 proceeds to step 206. In another embodiment (decision step 204, YES branch), render program 136 determines that the indicated webpage is a search engine; therefore, render program 136 proceeds to step 218.

Render program 136 queries memory (step 206). In other words, render program 136 examines memory to determine whether the indicated webpage is found. In one embodiment, the examined memory may be cache memory in user device 130. In other embodiments, the examined memory may be random access memory or hard disk memory in user device 130, memory found in web server 120, cloud storage, or any other type of available memory accessible by render program 136 over network 110.

Render program 136 determines whether the indicated webpage was previously loaded (decision step 208). In other words, render program 136 determines whether the webpage requested by the user has been previously rendered which resulted in a copy of that webpage being stored to cache memory. In one embodiment (decision step 208, NO branch), render program 136 determines the requested webpage was not previously loaded and is not stored to cache; therefore, render program 136 proceeds to step 210. In another embodiment (decision step 208, YES branch), render program 136 determines the requested webpage was previously loaded and is stored to cache; therefore, render program 136 proceeds to step 234.

Render program 136 renders the webpage (step 210). In other words, render program 136 determined that the requested webpage was not previously loaded (i.e., no version found in memory) so render program 136 allows the requested webpage to fully render. For this initial loading, render program 136 determines an outline around each content frame on the webpage for the user to use in selecting which frame the user wants to render first. In an embodiment of the present invention, user device 130 displays the requested webpage and the corresponding content frames after it completely loads. For example, the news channel's home page is fully rendered on user device 130 and ten different content frames are shown. Content may include sections for headlines, local and national news, sports, local weather forecast, advertisements, etc.

Render program 136 determines data (step 212). In other words, render program 136 determines the relevant data, such as the anchor DOM (Document Object Model) name and the corresponding Ajax (Asynchronous JavaScript and XML, where XML is the acronym for Extensible Markup Language) calls for the webpage. The DOM is a platform- and language-neutral interface that will allow programs and scripts to dynamically access and update the content, structure and style of documents. The document may be further processed and the results of that processing may be incorporated back into the rendered page. The nodes of every document are organized in a tree structure, called the DOM tree. Objects in the DOM tree may be addressed and manipulated by using methods on the objects. Ajax is a webpage development technology for creating interactive webpage applications. For a conventional webpage, if a portion of the webpage content has been updated, a user can see the updated content only after the entire webpage is refreshed. With an Ajax webpage however, a user can obtain the updated portion of the content without refreshing the entire webpage. From the perspective of a network device, this avoids repeatedly transmitting unaltered information, thus saving network bandwidth and reducing server workload. From the perspective of a user, wait times during webpage browsing may be effectively reduced, thus improving user experience. In an embodiment of the present invention, render program 136 determines the top DOM nodes and associated Ajax calls for the requested webpage. The DOM nodes and Ajax calls identify each frame on the webpage and control the order in which the frames are rendered. For example, on the news channel home page, the headlines may be in the frame identified by the DOM node and Ajax call as "1" (i.e., this frame will load first) while the local weather may be in frame "5" and will load fifth in sequence (after the first four frames load).

Render program 136 receives an indication of frame priority (step 214). In other words, render program 136 receives an indication from a user of what frame the user wants rendered first. In one embodiment, the user simply clicks within the desired frame to identify the frame as the first frame to load. For example, the user may click within frame "5" to indicate the user wants the local weather to load first. In another embodiment, the user may click outside the frame border; in this embodiment, the frame nearest the click location is identified as the frame to load first. In yet another embodiment, the user may again click outside the frame border; in this embodiment, no frame is identified to load first and render program 136 does nothing. In yet another embodiment, a user may click within more than one frame (e.g., first frame "7", then frame "2", then frame "8"); in this embodiment, frame "7" loads first followed by frame "2" and then frame "8". In yet another embodiment, rather than clicking within a frame or frames, render program 136 may identify the frames by the default load sequence (e.g., frame "1" equals one, frame "2" equals two, etc.) allowing a user to enter a single number or multiple numbers to define the load sequence desired by the user. In this embodiment, the user may enter seven to indicate that frame "7" should load first. Or the user may enter seven, two, and eight to indicate that frame "7" should load first followed by frame "2" and then frame "8". In all embodiments, render program 136 will render the balance of the webpage in the default sequence defined by the programmer after the user requests are completed. For example, for a webpage with five frames, the programmer defined sequence may be one, two, three, four, and five. In this example, if the user specifies that frame three should load first (i.e., a partial render sequence), the remaining frames will load in the programmer defined sequence of one, two, four, and five. In another embodiment, the user may specify an entire render order. In the preceding example, the user may specify an order of five, four, three, two, and one; in this example, the programmer defined render sequence is not used.

Render program 136 saves data (step 216). In other words, render program 136 saves the Ajax call data associated with the indicated frame priority from the user. In an embodiment of the present invention, the Ajax call data may be saved locally. For example, render program 136 may save the Ajax call data, indicating that frame "5" (the local weather on the home page of the local news webpage) should load first, to user device 130. In another embodiment, the Ajax call data may be saved to a remote location. For example, render program 136 may save the Ajax call data to web server 120. Once the Ajax call data is saved, render program 136 waits for a request to load this specific webpage again.

If render program 136 determines that a webpage has been previously loaded (decision step 208, YES branch), render program 136 fully renders the webpage based on priority (step 234). In other words, render program 136 renders the full webpage based on any indicated priority of the user. In one embodiment, render program 136 displays the requested webpage, based on the indicated priority of the user, via user interface 132 on user device 130. For example, render program 136 first displays the local weather on the home page of the local news channel and then fully renders the balance of the webpage on a tablet display. In another embodiment, render program 136 first displays the frame content associated with a search term via user interface 132 on user device 130. For example, render program 136 first displays the frame associated with the search term "wiring an outlet" and then fully renders the remainder of the indicated webpage on the tablet display.

Render program 136 receives a search term (step 218). In other words, render program 136 has previously determined a user has input one of any number of search engines (step 204) in the web browser's URL and now receives the input of a search term, from the user, to be used by the search engine. In an embodiment of the present invention, render program 136 receives the search term, input by the user via user interface 132 on user device 130, in web browser 134. In an embodiment, render program 136 stores the search term to memory on user device 130. For example, the user enters the search term "wiring an outlet" into SearchForinfo.com via the virtual keyboard on a tablet computer. In other embodiments, the search term may be input via a physical keyboard, via audio input using a microphone built into a device, or via any number of other input techniques known in the art. Also in other embodiments, render program 136 may store the search term to memory on web server 120, to local, removable memory such as a thumb drive, or to any other memory accessible via network 110.

Render program 136 receives the search results (step 220). In other words, render program 136 determines that the search engine has completed the search for the specific search term and the web browser displays the search results. In one embodiment, render program 136 determines web browser 134 is displaying the search results in user interface 132 on user device 130. For example, SearchForinfo.com has completed a search using the search term "wiring an outlet" and has returned one or more pages of search results, each page containing twenty individual results numbered one through twenty.

Render program 136 receives an indication of a selection (step 222). In other words, render program 136 receives an indication from a user of a selection of a specific webpage from the results of the search. In an embodiment of the present invention, render program 136 receives an indication via a mouse click in user interface 132 on user device 130. For example, a user clicks search result number four in the list of twenty search results. In another embodiment, the indication may be received via the enter key in user interface 132 on user device 130 or via any other input technique known in the art.

Render program 136 determines whether the indicated webpage was previously loaded (decision step 224). In other words, render program 136 determines whether the webpage requested by the user has been previously rendered which resulted in a copy of that webpage being stored to cache memory. In one embodiment (decision step 224, NO branch), render program 136 determines the requested webpage was not previously loaded and is not stored to cache; therefore, render program 136 proceeds to step 226. In another embodiment (decision step 224, YES branch), render program 136 determines the requested webpage was previously loaded and is stored to cache; therefore, render program 136 proceeds to step 230.

Render program 136 fully renders the indicated selection (step 226). In other words, render program 136 determined that the indicated webpage had not been previously loaded so render program 136 fully loads the indicated webpage. In an embodiment of the present invention, render program 136 displays the complete webpage, loaded from web server 120, on user device 130. For example, the full webpage from for a popular do-it-yourself website fully loads, including the content for "wiring an outlet" and is displayed on a tablet.

Render program 136 determines the Ajax call (step 228). In other words, render program 136 determines the appropriate Ajax call data corresponding to the search term for the indicated webpage and saves that call data. In one embodiment, render program 136 determines the Ajax call data for the indicated webpage displayed in user interface 132 on user device 130 and stores the call data to memory in user device 130. For example, render program 136 determines that the Ajax call for frame "4" is associated with the search term "wiring an outlet" in the fourth webpage in the search results and that information is stored to a tablet. Render program 136 then ends. When the indicated webpage is requested again, the webpage will render based on the Ajax call data associated with the search term.

Render program 136 starts webpage rendering (step 230). In other words, render program 136 has determined that the indicated webpage was previously loaded and now render program 136 begins to render the indicated webpage by cancelling the programmer defined Ajax calls and reorganizing the Ajax calls based on the search term so that the frame associated with (i.e., the frame that includes) the search term is the first frame to load. In an embodiment of the present invention, the frame associated with the search term, from the indicated webpage, is displayed first in user interface 132 on user device 130. For example, the frame associated with "wiring an outlet", from the indicated webpage, is displayed first on the tablet screen and the subsequent frames are displayed in the default order. In another embodiment, multiple frames on the indicated webpage may each include the search term; in this embodiment, those frames which include the search term are displayed first followed by the remaining frames on the webpage. For example, using the search term "baseball" and retrieving the local newspaper website may display the frame containing the Sports section (due to the inclusion of the previous day's baseball scores) and it may also display the frame containing the Headlines section (due to the inclusion of a story about the local baseball team winning their league title) before the remaining frames are rendered.

Render program 136 receives an indication (decision step 232). In other words, render program 136 determines whether the desired webpage is displayed based on receiving an indication from a user. In one embodiment (decision step 232, YES branch), render program 136 receives an indication that the displayed webpage is not desired by the user; therefore, render program 136 returns to step 222 to receive an indication of another webpage selection. In another embodiment (decision step 232, NO branch), render program 136 does not receive an indication from the user; therefore, render program 136 proceeds to step 234.

Render program 136 fully renders webpage (step 234). In other words, render program 136 renders the full webpage based on any indicated priority of the user. In one embodiment, render program 136 displays the requested webpage, based on the indicated priority of the user, via user interface 132 on user device 130. For example, render program 136 first displays the local weather on the home page of the local news channel and then fully renders the balance of the webpage on the tablet display. In another embodiment, render program 136 first displays the frame content associated with a search term via user interface 132 on user device 130. For example, render program 136 first displays the frame associated with the search term "wiring an outlet" and then fully renders the remainder of the indicated webpage on the tablet display.

Figure 3:
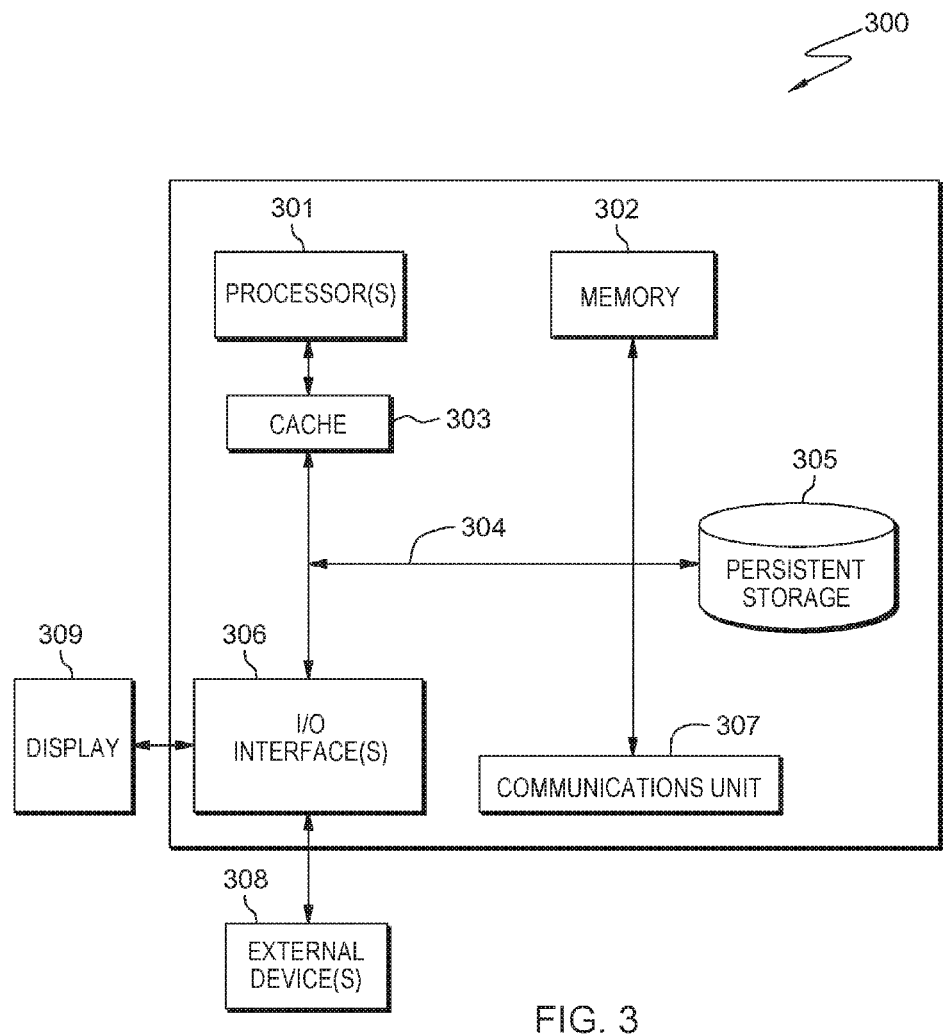
FIG. 3 depicts a block diagram of the components of a computing system representative of the client device and server device of FIG. 1, in accordance with an embodiment of the present invention.

FIG. 3 depicts computer system 300 which is an example of a system that includes web server 120 and user device 130. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for intelligently rendering a webpage based on user input, the method comprising:

receiving, by one or more computer processors, a first indication from a user, wherein the first indication is a request to load a webpage;

determining, by one or more computer processors, whether the requested webpage is a search engine, wherein the determination is based on a default list of search engines;

responsive to determining that the requested webpage is a search engine, receiving, by one or more computer processors, a search term, wherein the search term is stored in a memory, wherein the memory is at least one of cache memory, random access memory or hard disk memory;

receiving, by one or more computer processors, a set of search results based on the search term;

receiving, by one or more computer processors, a second indication from the user, wherein the second indication is a selection of a specific webpage from the search results and wherein the specific webpage includes two or more frames wherein a frame is a part of a webpage which displays content independent of its container with the ability to load content independently;

determining, by one or more computer processors, whether the selected specific webpage was previously rendered;

responsive to determining that the selected specific webpage was previously rendered, rendering, by one or more computer processors, the selected specific webpage, wherein the rendering results in a cancellation of the programmer defined Ajax calls for the selected specific webpage and a reorganization of the Ajax calls based on the search term such that a frame containing the search term is a first frame to load;

responsive to determining that the requested webpage is not a search engine, querying, by one or more computer processors, the memory;

determining, by one or more computer processors, whether the requested webpage was previously rendered based on the queried memory;

responsive to determining that the requested webpage was previously rendered, rendering, by one or more computer processors, the requested webpage based on an indicated priority of the user, wherein the indicated priority of the user was previously determined by the user and saved in the memory;

responsive to determining that the requested webpage was previously not rendered, receiving, by one or more computer processors, a third indication from a user, wherein the third indication is a priority of each of a two or more frames of the requested webpage and wherein the third indication is at least one of a mouse click in the frame, a mouse click outside the frame, or a number corresponding to the frame entered by the user; and saving, by one or more computer processors, the indicated priority in the memory.

* * * * *